United States Patent
Ohmi et al.

[11] Patent Number: 6,146,923
[45] Date of Patent: Nov. 14, 2000

[54] METHOD OF SMOOTHING FLUORINE-CONTAINING RESIN MOLDED ARTICLE AND SMOOTHED MOLDED ARTICLE

[75] Inventors: Tadahiro Ohmi, 2-1-17-301, Komegafukuro, Aoba-ku, Sendai-shi, Miyagi 980; Katsuhide Ohtani, Osaka, both of Japan

[73] Assignees: Tadahiro Ohmi; Daikin Industries, Ltd., Osaka, both of Japan

[21] Appl. No.: 08/896,458

[22] Filed: Jul. 18, 1997

Related U.S. Application Data

[63] Continuation of application No. 08/532,753, filed as application No. PCT/JP93/01073, Jul. 29, 1993, abandoned.

[30] Foreign Application Priority Data

Apr. 9, 1993 [JP] Japan ................................. 8-83253

[51] Int. Cl.⁷ ............................................. H01L 21/48
[52] U.S. Cl. ..................... 438/125; 438/126; 438/127; 427/302; 427/340; 118/667; 118/692
[58] Field of Search ................................. 264/293, 322, 264/325; 428/141, 421, 422; 438/115, 125, 126, 127; 427/221, 222, 302, 340; 525/200; 118/667, 692

[56] References Cited

U.S. PATENT DOCUMENTS

| | | | |
|---|---|---|---|
| 3,726,482 | 4/1973 | Kometani et al. | 241/5 |
| 3,758,649 | 9/1973 | Frattarola | 264/1.33 |
| 3,784,655 | 1/1974 | Lewchuk et al. | 264/293 |
| 3,790,245 | 2/1974 | Hannan et al. | 359/3 |
| 3,806,104 | 4/1974 | Clarke | 267/113 |
| 4,231,827 | 11/1980 | Wilson et al. | 264/293 |
| 4,232,075 | 11/1980 | Gantz et al. | 428/124 |
| 4,350,545 | 9/1982 | Garabedian | 156/87 |
| 4,351,869 | 9/1982 | Cresap | 428/121 |
| 4,400,487 | 8/1983 | Stoneberg et al. | 525/199 |
| 4,735,996 | 4/1988 | Nagai et al. | 525/326.4 |
| 5,051,479 | 9/1991 | Logothetis et al. | 525/197 |
| 5,087,680 | 2/1992 | Duan et al. | 526/254 |
| 5,156,343 | 10/1992 | Sueyoshi et al. | 241/3 |
| 5,169,583 | 12/1992 | Moriguchi et al. | 264/177.19 |
| 5,339,307 | 8/1994 | Dalton et al. | 264/113 |
| 5,380,349 | 1/1995 | Taniguchi et al. | 65/286 |
| 5,429,782 | 7/1995 | Masutani et al. | 264/127 |
| 5,473,018 | 12/1995 | Namura et al. | 525/200 |
| 5,496,639 | 3/1996 | Connell et al. | 428/413 |
| 5,670,189 | 9/1997 | Dalton et al. | 425/371 |
| 5,788,870 | 8/1998 | Nguyen et al. | 216/63 |
| 5,972,176 | 10/1999 | Kirk et al. | 204/164 |

FOREIGN PATENT DOCUMENTS

| | | |
|---|---|---|
| 496260 | 7/1992 | European Pat. Off. . |
| 56-78941 | 6/1981 | Japan . |
| 58-38740 | 3/1983 | Japan . |
| 60-034828 | 2/1985 | Japan . |
| 3-80277 | 4/1991 | Japan . |
| 4031030 | 5/1992 | Japan . |
| 4239627 | 8/1992 | Japan . |

*Primary Examiner*—John Guay
*Assistant Examiner*—Alonzo Chambliss
*Attorney, Agent, or Firm*—Varndell & Varndell, PLLC

[57] ABSTRACT

A fluorine-containing resin molded article can be obtained by putting it between smooth molds having a surface roughness (Ra) of not more than 50 Å and compression-molding it under molding conditions of a molding temperature of 270° to 340° C., a molding pressure of not less than 10 kg/cm² and compression time of not less than 2 minutes, to give smoothed fluorine-containing resin molded article having a surface roughness of not more than 500 Å. Particles, metal impurities, organic impurities or the like are difficult to adhere to the surface of the article, and can be removed significantly by washing.

4 Claims, 7 Drawing Sheets

METHOD OF SMOOTHING FLUORINE-CONTAINING RESIN MOLDED ARTICLE AND SMOOTHED MOLDED ARTICLE

CROSS-REFERENCE TO RELATED APPLICATION

This application is a continuation application of U.S. Ser. No. 08/532,753 filed Oct. 5, 1995, now abandoned, which is a U.S. National Phase application filed under 35 U.S.C. § 371 of PCT/JP93/01073, filed Jul. 29, 1993.

TECHNICAL FIELD

The present invention relates to a method of smoothing a fluorine-containing resin molded article and a smoothed molded article, and particularly relates to a method of smoothing a fluorine-containing resin molded article to give surface roughness (Ra) of not more than 500 Å.

BACKGROUND ART

A fluorine-containing resin is excellent in all of heat resistance, chemical resistance, electrically insulating properties and high frequency characteristics, and also has non-tackifying property and low abrasion property which are inherent to the fluorine-containing resin, and therefore is used in wide fields, such as space and aeronautic industries and home products as well as chemical industries, electrical and electronic industries and machine industries. Among the fluorine-containing resins, polytetrafluoroethylene (PTFE) and tetrafluoroethylene-perfluoro(alkyl vinyl ether) copolymer (PFA) are particularly excellent in heat resistance and chemical resistance, and therefore, are preferably used as materials essential to wafer carriers, bottles, washing tanks, filters, piping systems such as pumps, tubes and couplings, or linings for chemical tanks and valves in the semiconductor manufacturing field. Particularly in the wet process which occupies 20% of the whole semiconductor manufacturing process, since highly reactive and corrosive chemicals such as strong acids and strong alkalis are used at a very high temperature, resins for general uses such as polyethylene and poly(vinyl chloride) and metallic materials such as stainless steel cannot be used in such use. At present, only fluorine-containing resins such as PTFE and PFA are usable. However with the advancement of highly integrated highly dense LSI in recent years, it was found out that even fluorine-containing resins being excellent in the above-mentioned properties have some problems. In a process of manufacturing VLSI, since contaminations such as presence of a very small amount of particles, metals and organic contaminants remarkably affect its yield, an ultra-clean manufacturing process is required. Accordingly those fluorine-containing resin molded articles which often come to contact with a silicon wafer through chemical solution naturally require ultra cleanness. However the surface of the fluorine-containing resin molded articles which have been hitherto available is markedly rough, and thus particles, metal impurities, organic impurities, low molecular weight components (oligomer) of those resins and the like adhere to the above-mentioned uneven surface. These contaminants are difficult to remove by washing with ultra pure water and highly pure chemicals, and gradually flow out into the ultra pure water and highly pure chemicals during a long period of time in the wet process, and thereby silicon wafers are contaminated. Also those impurities removed from the silicon wafers through wet cleaning adhere again to the uneven surface of the fluorine-containing resin, and undesirably flow out again into the ultra pure water and highly pure chemicals. That is to say, if the surface of the fluorine-containing resin is uneven, adhesion and removal of those finely-divided impurities to and from the resin surface is repeated, and therefore, there is a risk such that silicon wafers not to mention of the ultra pure water and highly pure chemicals are contaminated.

Since PTFE has a very high melt viscosity ($10^{11}$ to $10^{13}$ poises at 380° C.), its molding cannot be conducted by a normal plastic molding method such as melt extrusion molding and injection molding, but there is used a specific method such that after raw material powder is previously compressed by a proper force, the pre-molded article is heated to a temperature of not less than its melting point and then sintered. Thus the molding is carried out by the compression molding, ram extrusion molding, paste extrusion molding, calender molding and the like, but in these molding methods, since the resin is not made uniform by melting, voids are easy to be generated in the molded article, and the surface of the molded article becomes uneven and rough. Therefore, the surface roughness of the PTFE molded article is considerably large as compared with that of other thermoplastic resins. The surface roughness (Ra) comes to be not less than 2,000 Å.

On the contrary, a melt viscosity of PFA is as low as $10^4$ to $10^6$ poises at 380° C., and a normal plastic molding such as injection molding, extrusion molding, blow molding or compression molding is used. Since the resin is made uniform by melting, the surface of the molded article is smoother than that of PTFE, but a spherulite structure having a diameter of about 20 μm to about 50 μm tends to remain and the surface roughness (Ra) is not less than 700 Å.

As mentioned above, a detailed analysis indicates that the surface of the conventional fluorine-containing resin molded article is rough and not satisfactory for use with semiconductors. In order to reduce the surface roughness of the molded article, studies have been made as to smoothing of the inner surface of a mold, improvement of the raw material resin itself and the like. However the surface having the roughness Ra of not more than 700 Å has not yet been obtained. Also in the field of ceramics, as a method to obtain high density and uniformity, a method of molding at a temperature as high as not less than 1,000° C. and under a pressure as high as not less than 600 kg/cm$^2$ (so-called HIP method) is known. However in such severe molding conditions, fluorine-containing resins are decomposed and deteriorated, and thus cannot be molded under such conditions.

An object of the present invention is to provide a method of smoothing a fluorine-containing resin molded article, which can assure its surface roughness (Ra) to be not more than 500 Å in order to comply with the use for semiconductor manufacturing process, and to provide a fluorine-containing resin molded article having a surface roughness of not more than 500 Å.

DISCLOSURE OF THE INVENTION

The method of smoothing fluorine-containing resin molded article of the present invention is characterized by reducing the surface roughness (Ra) of the fluorine-containing resin molded article to not more than 500 Å by putting the fluorine-containing resin molded article between smooth molds, which have the surface roughness (Ra) of not more than 50 Å, and molding under the conditions of a molding temperature of 270° to 340° C., a molding pressure of not less than 10 kg/cm$^2$ and a compression time of not less than 2 minutes.

BRIEF DESCRIPTION OF THE DRAWINGS

In FIG. 5 the cleaning steps include dipping the sheets for 10 minutes in 800 ml of a mixed solution of sulfuric acid and hydrogen peroxide (volume ratio 4:1), which is hereinafter referred to as "SPM cleaning."

In FIG. 6 the cleaning steps include dipping the sheets in a mixture of ammonia, hydrogen peroxide, and ultra pure water (volume ratio 1:1:5), which is hereinafter referred to as "APM cleaning."

BEST MODE FOR CARRYING OUT THE INVENTION

Figure 1:
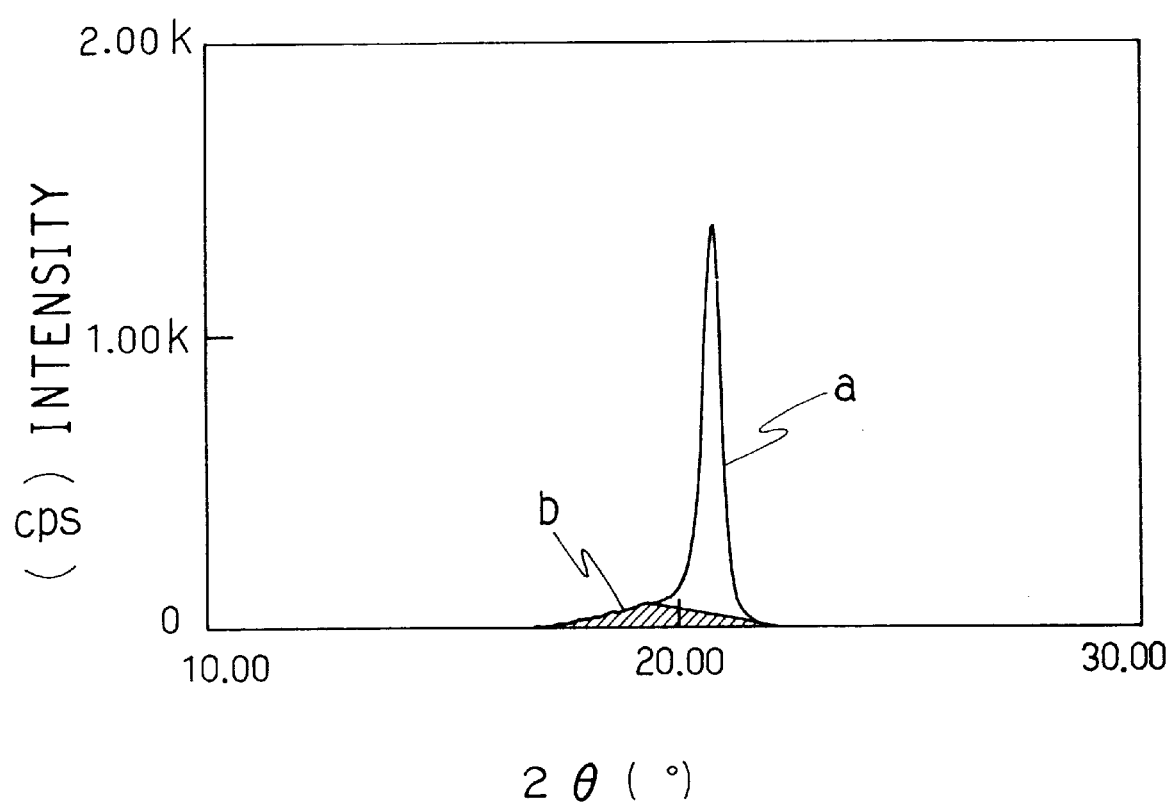
FIG. 1 shows an X-ray diffraction chart of a smoothed PFA sheet obtained in Experimental Example 6-5 of Example 6.

In the present invention, a fluorine-containing resin molded article is put between very smooth (Ra of not more than 50 Å) molds, and in addition, the compression molding is carried out under the optimum heating and compressing conditions for increasing crystallinity of the molded article and reducing a size of crystallite. Thus a highly dense surface structure can be obtained and as a result, the surface roughness (Ra) can be lowered to not more than 500 Å.

As the fluorine-containing resin for the present invention, there are polytetrafluoroethylene (PTFE), tetrafluoroethylene-perfluoro(alkyl vinyl ether) copolymer (PFA), tetrafluoroethylene-hexafluoropropylene copolymer (FEP), polychlorotrifluoroethylene (PCTFE), poly (vinylidene fluoride) (PVdF), tetrafluoroethylene-ethylene copolymer (ETFE), poly(vinyl fluoride) (PVF), chlorotrifluoroethylene-ethylene copolymer (ECTFE) and the like. The PTFE may contain other comonomer such as perfluorovinyl ether, hexafluoropropylene, chlorotrifluoroethylene, vinylidene fluoride or trifluoroethylene in an amount up to 1% by weight. These fluorine-containing resins are ones which are not melt-processable or which can only give a molded article having a rough surface, even if melt-processable.

The fluorine-containing resin molded articles which are subjected to the smoothing treatment of the present invention may be those molded by any molding method. As the molding method of the fluorine-containing resins, as mentioned above, for PTFE there are the ram extrusion molding, paste extrusion molding, calender molding and the like in addition to the compression molding, and for melt-processable resins such as PFA there are the compression molding, injection molding, extrusion molding, blow molding, transfer molding and the like. In case of the molded PTFE article, it is preferable to use one sintered after molded by the above-mentioned molding method. The shape and size of the molded article are optional if it has a simple surface or simple curved surface.

The present invention relates to a method to put the above-mentioned fluorine-containing resin molded article between molds having a smooth surface and conduct the compression molding under specific conditions.

The surface roughness (Ra) of the molds must be not more than 50 Å. When Ra is larger than 50 Å, the desired smoothing effect cannot be obtained. Preferable Ra is not more than 30 Å. As the method to make the surface roughness of the mold being not more than 50 Å, there are, for example, machine polishing, chemical polishing, electrolytic polishing and the like, but the method is not limited thereto. As preferable materials for the mold, there are, for example, silicon (including silicon wafer), electrolytically polished stainless steel, Hastelloy, X-alloy, hard chromium plated steel and the like, and silicon is particularly preferable since its surface roughness is small. This mold contacts directly to the molded article at the time of the compression molding, and in case where the molded article is in a simple shape such as sheet, film, gasket, round bar, round-shaped container, or square container, the sheet-like mold having a simple plane surface or simple curved surface is preferable. In case where the molded article is in a complicated shape such as a wafer carrier, filter housing or ball valve, the mold to be used may be such that a silicon sheet is laminated on the inner surface of a usual injection-molded mold made of hard chromium plated steel.

The fluorine-containing resin molded article put between the molds is then compression-molded. In case of a molded article having simple shape, the compression molding can be conducted with a usual compression molding machine and the like. On the contrary, in case of a molded article having complicated shape, the molded article is put between the desired shape of molds, set on a compression molding machine and compressed not from one direction but from various directions, and thus compression-molded. It is also possible to make every surface of the article smooth in turn by repeating the step of compressing in one direction, the step of taking out the molded article from the mold and the step of compressing in another direction. For hollowed molded articles such as tubes and pipes, it is possible to insert a smooth mold having a shape of round bar inside the molded article and mold from the outside with a smooth mold of a cylindrical shape by compression molding.

A molding temperature is not less than a temperature where softening of the fluorine-containing resin starts and not more than a thermal decomposition temperature, and is selected within a temperature range of 270° to 340° C., preferably 280° to 300° C., depending on a kind and molecular weight of the fluorine-containing resin. When the molding temperature is too low, neither melting nor softening occurs and smoothing becomes difficult. When too high, the fluorine-containing resin is decomposed and deteriorated.

A molding pressure is not less than 10 kg/cm², preferably 50 to 150 kg/cm². When the pressure is too low, the molded article shrinks at the cooling process, and contact of its surface with the mold becomes insufficient, and a desired surface smoothness cannot be obtained.

A molding time is determined according to the molding temperature, molding pressure, the kind and molecular weight of the fluorine-containing resin and the like, and is not less than 2 minutes, normally not less than 5 minutes, preferably 30 to 120 minutes. If the molding time is too short, melting and thermosoftening are insufficient, and a desired surface roughness cannot be obtained.

The molded article is cooled after compressed and heated. Cooling may be conducted by slow cooling or rapid cooling. Since the molded article shrinks nonuniformly in the cooling process, it is preferable to cool it to ordinary temperature under pressure.

The obtained smoothed molded article has a high crystallinity and the crystallites thereof are small. Also unevenness due to hexagonal pattern on the surface of the molded article generated through a spherulite crystal growth, is smoothed, and thus the surface roughness is not more than 500 Å, preferably not more than 400 Å.

The shape of the smoothed molded article depends on the shape of the starting molded article and the mold, and normally it is possible to form into a shape of sheet, film, cylinder and the like.

The smoothed molded article of the fluorine-containing resin of the present invention has small surface roughness which has not been obtained hitherto, and is very useful for the fields where smooth surface is required, particularly as materials for devices, equipments and the like for manufacturing semiconductors. Also particles, metal impurities, organic impurities and the like are difficult to adhere to the surface of the smoothed molded article, and can be significantly removed by washing. Those removed by washing can be prevented from adhering again. Further properties such as gas permeability, chemical solution permeation and chemical resistance are improved.

As the smoothed molded articles of the fluorine-containing resin of the present invention, there are, for example, a wafer carrier, wafer box, handle for carrier, bottle, beaker, flask, round-shaped container, square container, tank, square vat, tray, filter housing, forceps, vacuum forceps, spatula, aspirator, flowmeter, pump, pipe, tube, flexible pipe, thermal shrinkage pipe, ball valve, needle valve, cock, connecting joint, connector, nut, film, sheet, gasket, round bar, or lining for chemical tanks, containers, pipes, valves, pumps and the like.

The method and the smoothed molded article of the present invention are explained below based on Examples, but the present invention is not limited thereto.

Example 1

A commercially available PTFE sheet (Ra 2,095 Å) of 1 mm thick was cut into a circular shape of 100 mm diameter, and it was sandwiched by 4 inch silicon wafers (circular shape of 100 mm diameter, specular side, Ra 20 Å. P(100) type of Kabushiki Kaisha Osaka Titanium) at the top and bottom of it. Then the sheet was set on a 100 mm diameter compression molding molds made of chrome plated stainless steel, and put on a heating section of a compression molding machine (heat press, available from Kabushiki Kaisha Shinto Kinzoku Kogyosho) having been heated previously to a given temperature shown in Table 1. After preheating for 5 minutes, a pressure was applied at 50 kg/cm$^2$ for one hour while maintaining the above-mentioned temperature. The mold was then immediately transferred to a cooling section and cooled for 15 minutes while maintaining the same pressure as above. The PTFE sheet cooled down to nearly room temperature was taken out, and the surface roughness (Ra) was measured with a contact type roughness meter (available from Nippon Shinku Gijutsu Kabushiki Kaisha, DEKTAK 3030ST). The results of Ra when the molding temperature was varied are shown in Table 1. The roughness Ra was measured at 10 optional points each on the top and bottom surfaces of the sheet, 20 points in total, and the average roughness thereof is shown in the table (hereinafter the same as in the following examples).

TABLE 1

|  | Molding temperature (° C.) | Surface roughness (Ra) (Å) |
|---|---|---|
| Raw sheet | — | 2,095 |
| Experimental Example 1-1 | 280 | 344 |
| Experimental Example 1-2 | 300 | 371 |
| Experimental Example 1-3 | 330 | 471 |
| Experimental Example 1-4 | 350 | 656 |

Example 2

Commercially available PFA sheets (Ra 923 Å) of 1 mm thick were used instead of the PTFE sheet used in Example 1. Also smoothed sheets were prepared in the same manner as in Example 1 except that the compression time was 5 minutes and the molding temperature was shown in Table 2. The results of Ra of these sheets are shown in Table 2.

TABLE 2

|  | Molding temperature (° C.) | Surface roughness (Ra) (Å) |
|---|---|---|
| Raw sheet | — | 923 |
| Experimental Example 2-1 | 260 | 947 |
| Experimental Example 2-2 | 280 | 212 |
| Experimental Example 2-3 | 300 | 341 |
| Experimental Example 2-4 | 320 | 489 |
| Experimental Example 2-5 | 350 | 510 |

Example 3

Smoothed sheets were prepared in the same manner as in Example 1 except that after heating at 280° C. for 5 minutes, a pressure shown in Table 3 was applied for 1 hour with the temperature being maintained at 280° C. The results of Ra of these sheets are shown in Table 3.

TABLE 3

|  | Molding pressure (kg/cm$^2$) | Surface roughness (Ra) (Å) |
|---|---|---|
| Raw sheet | — | 2,095 |
| Experimental Example 3-1 | 5 | 924 |
| Experimental Example 3-2 | 50 | 344 |
| Experimental Example 3-3 | 100 | 398 |
| Experimental Example 3-4 | 150 | 427 |

Example 4

Smoothed sheets were prepared in the same manner as in Example 3 except that the same PFA sheets as in Example 2 were used. The results of Ra of these sheets are shown in Table 4.

TABLE 4

| | Molding pressure (kg/cm$^2$) | Surface roughness (Ra) (Å) |
|---|---|---|
| Raw sheet | — | 923 |
| Experimental Example 4-1 | 5 | 542 |
| Experimental Example 4-2 | 50 | 94 |
| Experimental Example 4-3 | 100 | 261 |
| Experimental Example 4-4 | 150 | 256 |

Example 5

Smoothed sheets were prepared in the same manner as in Example 1 except that the sheets were heated at 280° C. for 5 minutes and then subjected to compression at 50 kg/cm$^2$ for the time period shown in Table 5 with the temperature being maintained at 280° C. The results of measuring Ra of these sheets are shown in Table 5.

TABLE 5

| | Compression time | Surface roughness (Ra) (Å) |
|---|---|---|
| Raw sheet | — | 2,095 |
| Experimental Example 5-1 | 5 min | 437 |
| Experimental Example 5-2 | 30 min | 386 |
| Experimental Example 5-3 | 1 hr | 344 |
| Experimental Example 5-4 | 5 hrs | 292 |
| Experimental Example 5-5 | 24 hrs | 278 |

Example 6

Smoothed sheets were prepared in the same manner as in example 5 except that the same PFA sheets as in Example 2 were used and the compression time was shown in Table 6. The results of Ra of these sheets are shown in Table 6.

татBLE 6

| | Compression time | Surface roughness (Ra) (Å) |
|---|---|---|
| Raw sheet | — | 923 |
| Experimental Example 6-1 | 1 min | 572 |
| Experimental Example 6-2 | 5 min | 212 |
| Experimental Example 6-3 | 30 min | 165 |
| Experimental Example 6-4 | 45 min | 153 |
| Experimental Example 6-5 | 1 hr | 94 |
| Experimental Example 6-6 | 2 hrs | 144 |
| Experimental Example 6-7 | 3 hrs | 178 |
| Experimental Example 6-8 | 5 hrs | 199 |

TABLE 6-continued

| | Compression time | Surface roughness (Ra) (Å) |
|---|---|---|
| Experimental Example 6-9 | 12 hrs | 158 |
| Experimental Example 6-10 | 24 hrs | 180 |

An X-ray diffraction analysis of the thus smoothed PFA sheets was also carried out by using an X-ray diffractometer (available from Rigaku Denki Kabushiki Kaisha) with a monochromator. The voltage and ampere of an X-ray lamp were 35 kV and 40 mA, respectively, and cobalt (Co) was used as a target in combination use of an Fe filter for removing Co-kβ rays. A divergence slit (DS), light receiving slit (RS) and scattering slit (SS) of a goniometer were 1.00, 0.15 and 1.00 mm, respectively, and a 2θ scanning range of 10 to 30° was measured at a scanning speed of 1.5°/min. FIG. 1 shows the results of the smoothed PFA sheet obtained in Experimental Example 6-5.

As shown in FIG. 1, since PFA is a semi-crystalline resin, PFA has a sharp peak at 2θ of about 20.8° due to the crystal portion and a broad peak at a low angle side thereof due to the amorphous portion. Connecting the inflection points at both sides of the sharp peak by a straight line, the area is divided into a peak area "a" due to the crystal portion and a peak area "b" due to the amorphous portion. The crystallinity of PFA was calculated simply by the following equation.

$$\text{Crystallinity (\%)} = \frac{a}{a+b} \times 100$$

Further the size of crystallite was obtained by the following Scherrer's equation.

$$\text{Size of crystallite (Å)} = \frac{K \cdot \lambda}{\beta \cdot \cos\theta}$$

wherein, λ is a wavelength of X-rays (Co-kα, 1.78892 Å), β is a full width of half maximum intensity (radian) of the peak of crystal, θ is a Bragg's angle (radian) of the peak of crystal and K is a constant. K is 0.9 because a full width of half maximum intensity is used for β. Table 7 shows the results of the above-mentioned calculations of the crystallinity and the size of crystallite.

TABLE 7

| | Compression time | Crystallinity (%) | Size of crystallite (Å) |
|---|---|---|---|
| Raw sheet | — | 61 | 226 |
| Experimental Example 6-2 | 5 min | 63 | 218 |
| Experimental Example 6-3 | 30 min | 73 | 221 |
| Experimental Example 6-5 | 1 hr | 74 | 222 |
| Experimental Example 6-8 | 5 hrs | 77 | 221 |
| Experimental Example 6-10 | 24 hrs | 78 | 195 |

Thus there is a tendency that the PFA sheet, which is put between silicon wafers and compression-molded, has an increased crystallinity and smaller size of crystallites as compared with the raw sheet. That is to say, the surface of the PFA sheet prepared by the present invention can be considered to be smooth because a plurality of small crystals are formed at the surface of the sheet and the dense surface structure can be obtained.

Example 7

A test for removing metal impurities from the surface of PFA was carried out by using a raw PFA sheet (Ra 760 Å) and the smoothed PFA sheet (Ra 94 Å) obtained in Experimental Example 6-5.

A total reflection of X-ray fluorescence spectrometer (available from Kabushiki Kaisha Technos, TREX610) was used to measure a density of the metal at the surface. In order to convert an intensity of fluorescent X-rays to a metal density per unit area, since it is difficult to prepare a contaminated reference PFA sample, a calibration curve of a contaminated reference silicon wafer was used. After these sheets were overflow-rinsed with ultra pure water for 10 minutes, the surface metal density was measured. After the measurement, these sheets were dipped for 10 minutes in 800 ml of a mixed solution of sulfuric acid and hydrogen peroxide (volume ratio 4:1) which is of semiconductor manufacturing grade (so-called SPM cleaning normally used for washing a silicon wafer), and further overflow-rinsed with ultra pure water for 10 minutes. After the SPM cleaning, the surface metal density was measured again. The change in densities of Fe, Ni and Cu at the surface of PFA sheet before and after the SPM cleaning is shown in Table 8. A metal removal rate in Table 8 was calculated by the following equation.

Removal rate (%)=(Density before cleaning−density after cleaning)/density before cleaning×100

TABLE 8

|  | Raw sheet (Ra 760 Å) | | | Smoothed sheet (Ra 94 Å) | | |
| --- | --- | --- | --- | --- | --- | --- |
|  | Fe | Ni | Cu | Fe | Ni | Cu |
| Surface metal density ($10^{10}$ atom/cm$^2$) | | | | | | |
| Before cleaning | 1,030 | 100 | 677 | 1,026 | 90 | 682 |
| After cleaning | 925 | 92 | 621 | 396 | 17 | 297 |
| Removal rate (%) | 10 | 8 | 8 | 61 | 81 | 56 |

As mentioned above, the metal impurities on the smoothed PFA sheet are easy to remove as compared with the raw sheet.

Example 8

A test for re-adhesion of the metal impurities was carreid out by using a raw PFA sheet and a smoothed PFA sheet which were subjected to the SPM cleaning in Example 7. These SPM-cleaned sheets were dipped for four days in 800 ml of ultra pure water contaminated with 1 ppm each of Fe, Ni and Cu. After the completion of the dipping, these sheets were overflow-rinsed with ultra pure water for 10 minutes, and then the metal density of the sheet surface was measured with the total reflection of X-ray fluorescence spectrometer. The change in Fe, Ni and Cu densities at the surface of the sheets before and after the dipping is shown in Table 9.

Thus while there occurs re-adhesion of metal impurities on the raw sheet having a large surface roughness, no re-adhesion occurs on the smoothed sheet.

TABLE 9

|  | Raw sheet (Ra 760 Å) | | | Smoothed sheet (Ra 94 Å) | | |
| --- | --- | --- | --- | --- | --- | --- |
|  | Fe | Ni | Cu | Fe | Ni | Cu |
| Surface metal density ($10^{10}$ atom/cm$^2$) | | | | | | |
| Before cleaning | 925 | 92 | 621 | 396 | 17 | 297 |
| After cleaning | 1,050 | 112 | 667 | 395 | 17 | 298 |

As shown above, no adhesion of metal impurities occur on the smoothed PFA surface. Further even if metal contamination occurs in a molding process, packaging process or during use due to any reason, such metal impurities can be easily removed by the SPM cleaning or the like as shown in Example 7.

It has been said that adhesion of metal impurities occurs on the surface of a fluorine-containing resin (particularly bottles and the like) though in a trace amount, and it is considered that this contamination is caused from a rough surface having Ra of not less than 700 Å. With respect to the smoothed fluorine-containing resin molded articles of Examples of the present invention, no adhesion of metal impurities occurs on the surface thereof. This is an inherent property of the fluorine-containing resin.

Example 9

By using a raw PFA sheet and a smoothed PFA sheet, which were previously subjected to the SPM cleaning in Example 7, a test of transfer of metal impurities from these sheets to silicon wafers was conducted. These SPM-washed sheets were brought into contact with the silicon wafers (specular side, N(100) type from Komatsu Denshi Kinzoku Kabushiki Kaisha), from which oxidized films and metal impurities had been previously removed sufficiently by RCA cleaning, and the both sheets were put so that the surfaces thereof contact with each other, and then dipped in 800 ml of ultra pure water for 10 minutes. The change in densities of Fe, Ni and Cu on the surface of the silicon wafers before and after the dipping is shown in Table 10.

While the silicon wafer brought into contact with the raw sheet is remarkably metal-contaminated, one brought into contact with the smoothed sheet shows nearly no change in the metal density on its surface, i.e. no contamination occurs.

TABLE 10

|  | Silicon wafer contacting raw sheet (Ra 760 Å) | | | Silicon wafer contacting smoothed sheet (Ra 94 Å) | | |
| --- | --- | --- | --- | --- | --- | --- |
|  | Fe | Ni | Cu | Fe | Ni | Cu |
| Surface metal density ($10^{10}$ atom/cm$^2$) | | | | | | |
| Before dipping | 8 | 1 | 10 | 9 | 2 | 11 |
| After dipping | 45 | 8 | 36 | 8 | 2 | 12 |

Example 10

Figure 2:
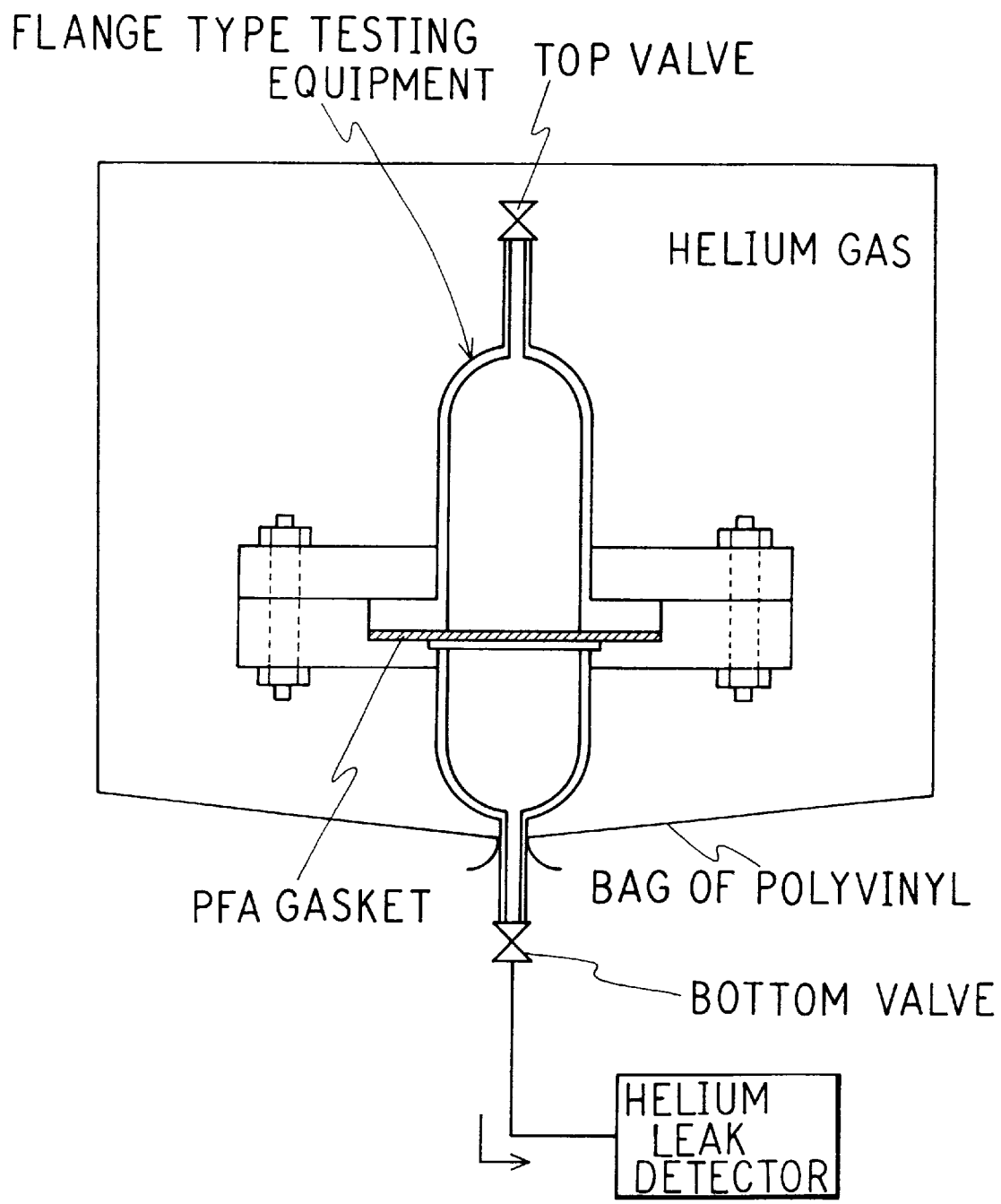
FIG. 2 shows a diagrammatic view of a flange type testing equipment for the helium gas permeation test used in Example 10.
Figure 3:
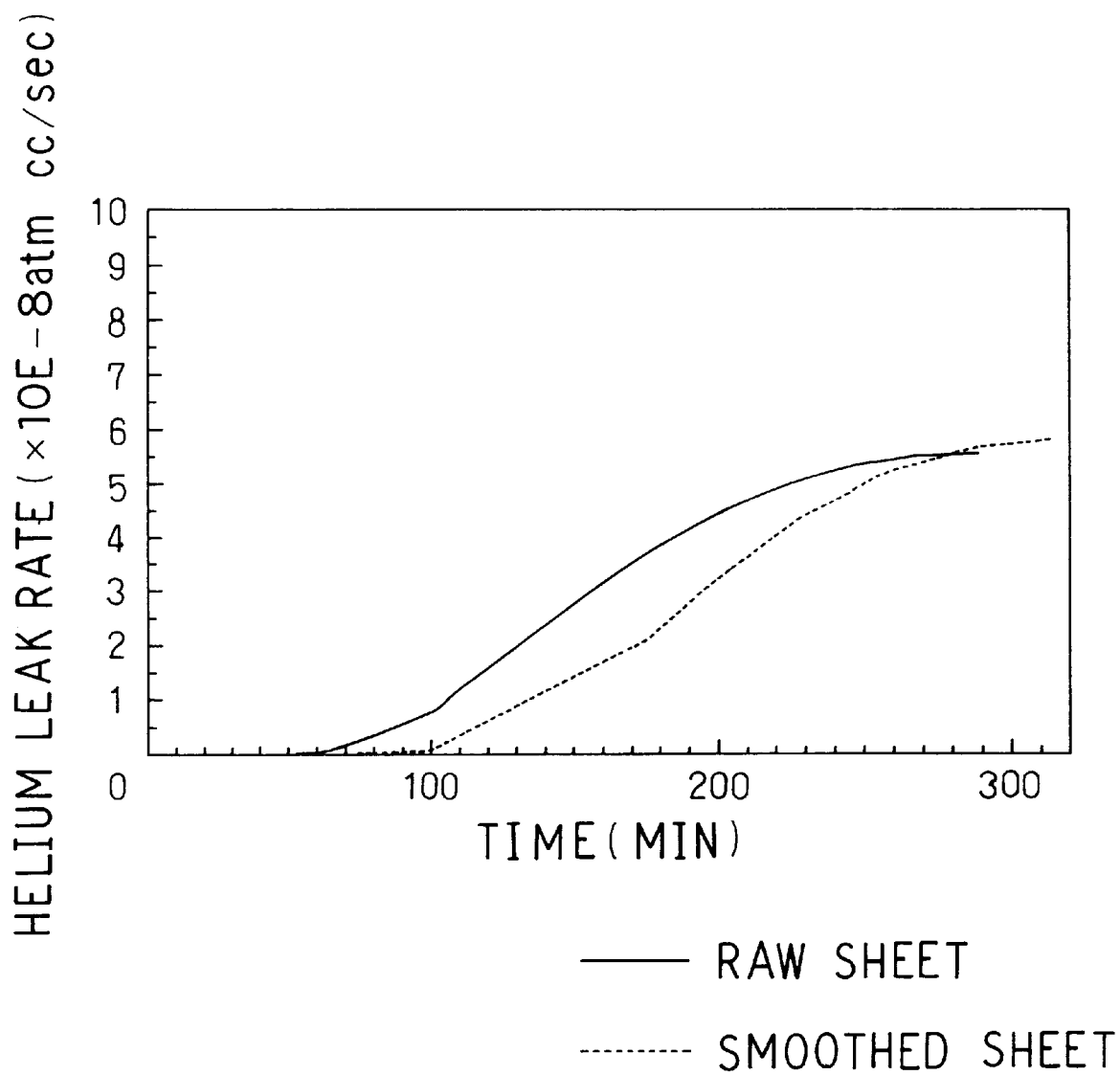
FIG. 3 is a graph showing the helium gas leak rate with lapse of time in case where the raw sheet and the smoothed sheet of PFA are used as the gasket.

A helium gas permeation test was carried out by using a raw PFA sheet (Ra 760 Å) and the smoothed PFA sheet (Ra 144 Å) obtained in Experimental Example 6-6. These sheets were cut to a shape of a gasket having 65 mm outer diameter and 30 mm inner diameter, set on a flange type stainless steel testing equipment shown in FIG. 2, and then fixed by means of bolts and nuts (fixing torque 400 kg.cm). A top valve of the testing equipment was closed and a bottom valve was connected to a helium leak detector (from ANELVA, ALCATEL ASM 110 TURBO CL) through a stainless steel tube. After reducing air in the testing equipment sufficiently by means of the helium leak detector and the bottom valve was opened, a bag of polyvinyl was put over the testing equipment, and the inside of the bag was filled with helium gas. A helium leak speed into the equipment was measured from a time when helium gas was introduced (measurement start point) until the inside of the testing equipment becomes saturated. The change in the helium leak speed with lapse of time is shown in FIG. 3. It was seen that in case of the smoothed sheet, the helium leak begins at delayed time and helium gas permeability is low as compared with the raw sheet.

Example 11

Figure 4:
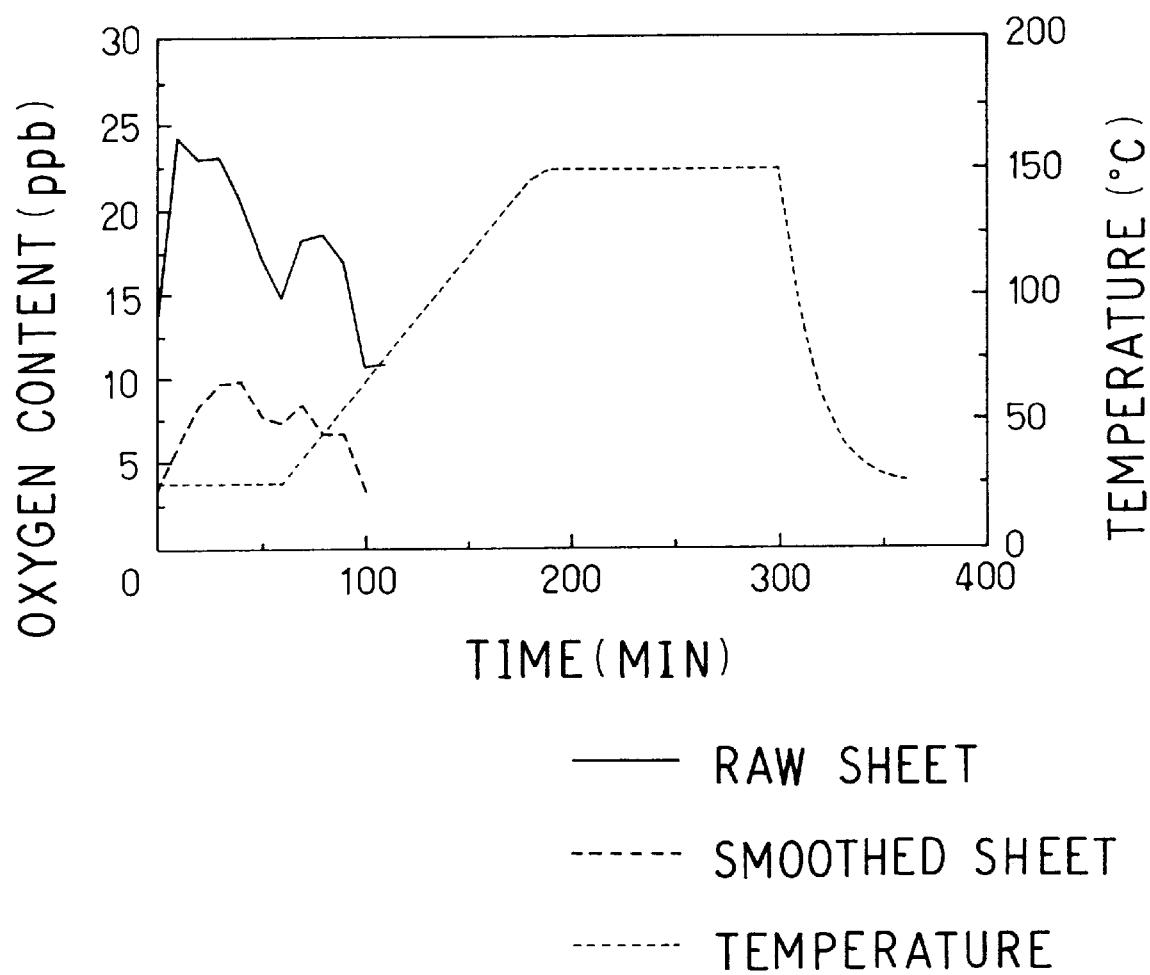
FIG. 4 is a graph showing the released oxygen gas volume from the raw PFA sheet and the smoothed PFA sheet when a temperature was raised to 150° C.

An oxygen gas release test was carried out by using the same raw PFA sheet (Ra 760 Å) and smoothed PFA sheet (Ra 144 Å) as used in Example 10. Each sheet was punched to a type V dumbbell described in ASTM-D638 to give test specimens. One of these specimens was put in a stainless steel tube (inner diameter 10.2 mm), one end of which was connected to API-MS (from Hitachi Tokyo Electronics Kabushiki Kaisha, highly sensitive gas analyzer, UG-302P). A carrier gas, i.e. argon gas (oxygen gas content of not more than 1 ppb) was forced to flow from another end of the tube at a rate of 1.2 liters/min to purge the inside of the tube with argon gas for 3 minutes. After purging, from a measuring start point when the argon gas began to flow through the detector of API-MS, the oxygen content in the carrier gas was measured every 10 minutes. The change in the oxygen content with lapse of time is shown in FIG. 4. The outside of the tube was wound with a ribbon heater, and as shown in FIG. 4, after heating up from room temperature to 150° C., cooling was done to room temperature again. It could be known from FIG. 4 that the released oxygen gas amount from the smoothed sheet was decreased to not more than a half of that of the raw sheet.

Example 12

A chemical resistance test at the time of SPM cleaning was carried out by using the same raw PFA sheet (Ra 760 Å) and smoothed PFA sheet (Ra 94 Å) used in Example 7. Each sheet was punched to a type V dumbbell described in ASTM-D638 to give test specimens. After these specimens were vacuum-dried at 40° C. for 12 hours, the weight of them was measured with a precise balance (this value is assumed to be "x"). Subsequently each 3 of these specimens were dipped in 800 ml of a mixture of sulfuric acid and hydrogen peroxide (volume ratio 4:1) of semiconductor manufacturing grade for 10 minutes. Further those sheets were overflow-rinsed with ultra pure water for 2 minutes (this is called SPM cleaning). After repeating the SPM cleaning several times, the specimens were again vacuum-dired at 40° C. for 12 hours, and the weight of them was measured with a precise balance (this value is assumed to be "y"). The rate of weight change was calculated by the following equation.

$$\text{Rate of weight change } (\%)=(y-x)/x\times100$$

Figure 5:
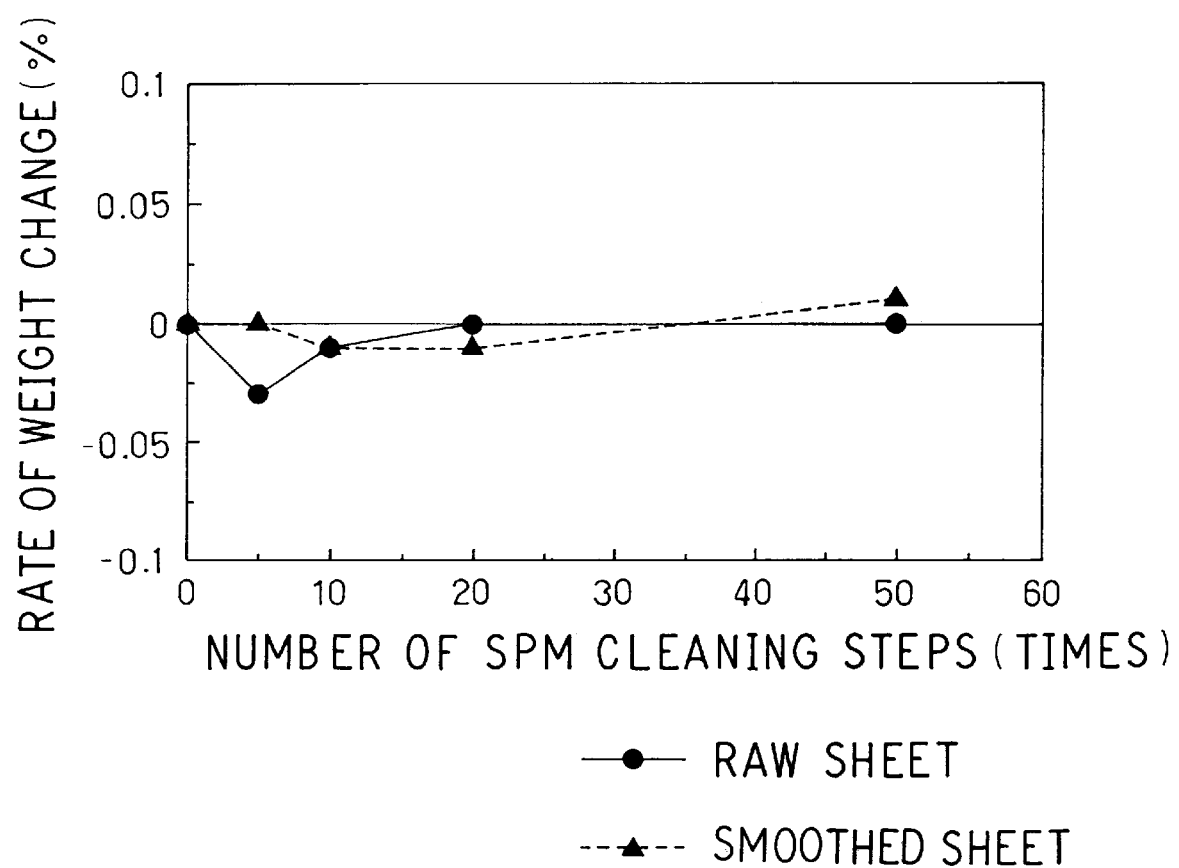
FIG. 5 is a graph showing the change of a weight change rate depending on the number of cleaning steps of the raw PFA sheet and the smoothed PFA sheet.

The change of the rate of the weight change (average value of three specimens) with respect to the repeated times of the SPM cleaning is shown in FIG. 5.

From FIG. 5 it was recognized that there was a decrease in the weight of the raw sheet at the time when SPM cleaning was carried out five times. On the contrary, there was almost no change in the weight of the smoothed sheet, and it was found to be excellent in chemical resistance in SPM cleaning.

Example 13

A chemical resistance test in case of APM cleaning was carried out by replacing SPM cleaning in Example 12 by APM cleaning. The rate of the weight change was obtained in the same manner as in Example 12 except that the used solution for dipping was changed from the mixture solution of sulfuric acid and hydrogen peroxide in Example 12 to a mixture solution of aqueous ammonia, hydrogen peroxide and ultra pure water (volume ratio 1:1:5). The change of the rate of the weight change with respect to the repeated times of the APM cleaning is shown in FIG. 6.

Figure 6:
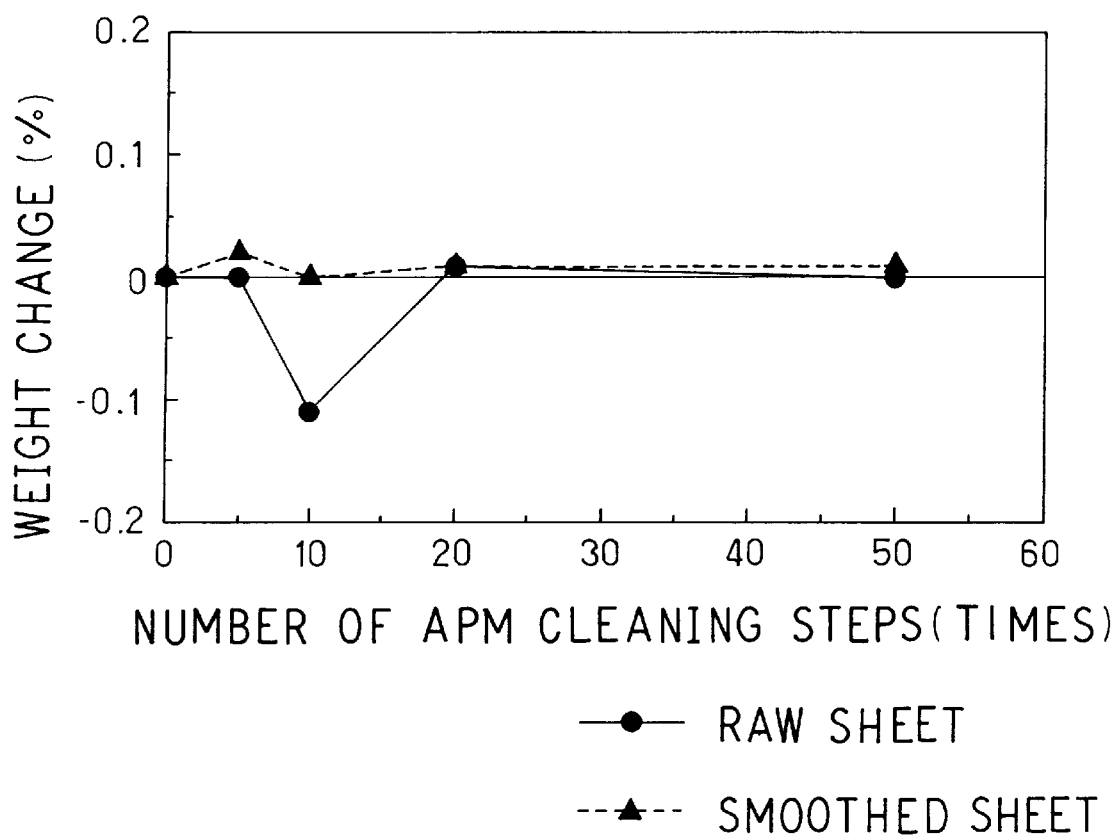
FIG. 6 is a graph showing the change of a weight change rate depending on the number of cleaning steps of the raw PFA sheet and the smoothed PFA sheet.

From FIG. 6, a decrease in the weight of the raw sheet was recognized at the time when APM cleaning was carried out 10 times. On the contrary, there was almost no change in the weight of the smoothed sheet, and it was found to be excellent in chemical resistance in case of APM cleaning.

Example 14

Figure 7:
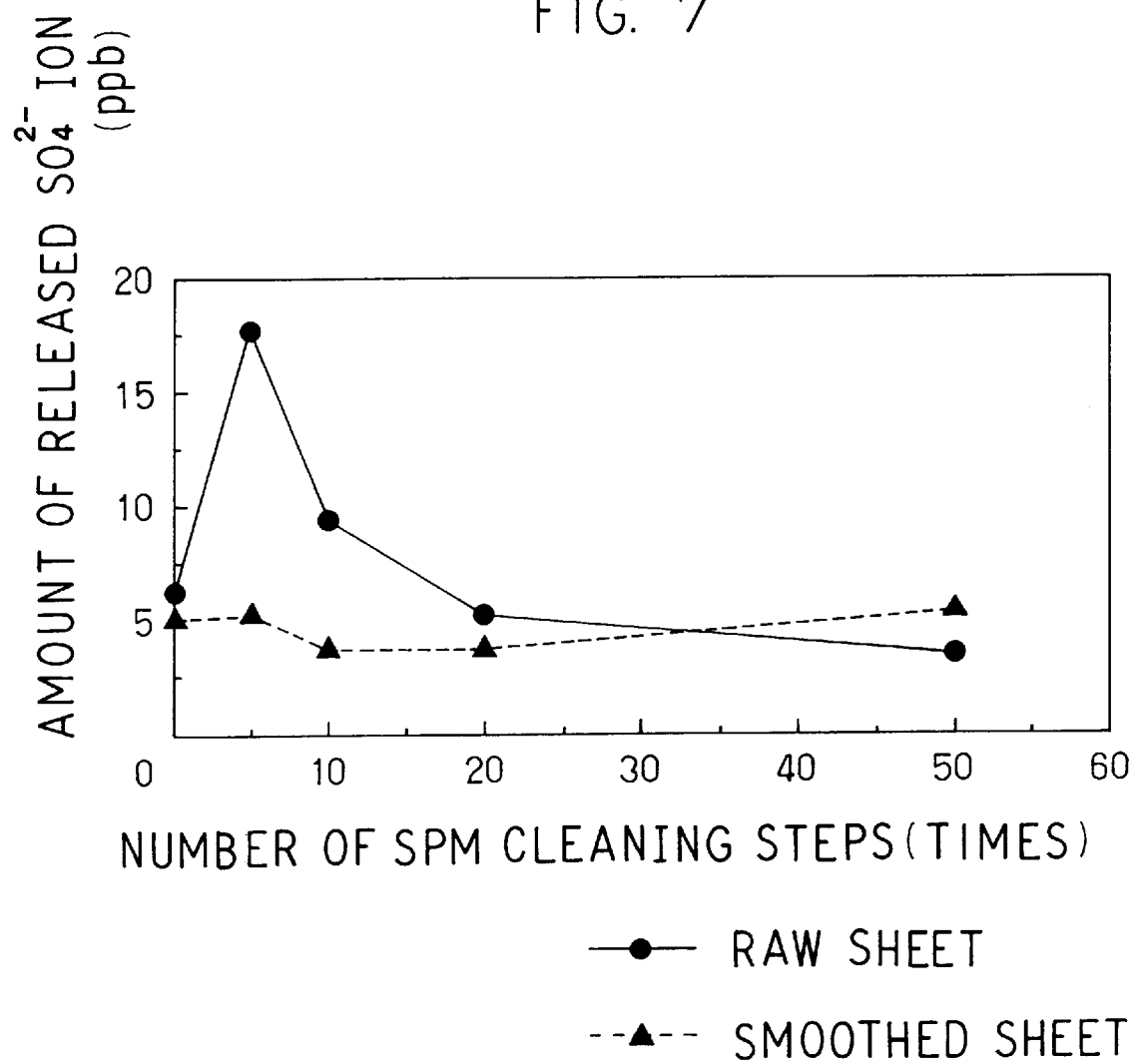
FIG. 7 is a graph showing the change of an amount of released sulfuric acid ion ($SO_4^{2-}$) depending on the number of SPM cleaning steps of the raw PFA sheet and the smoothed PFA sheet which were allowed to stand in the ultra pure water for one month after the SPM cleaning.

A test of re-releasing chemicals from the specimens which had been SPM-cleaned in Example 12 was carried out. One of these specimens was put in a 1 liter polyethylene bottle sufficiently washed previously with ultra pure water. Then 200 ml of ultra pure water was poured in the bottle and it was held to stand for one month. Afterwards a sulphate ion ($SO_4^{2-}$) in the ultra pure water was measured with an ion chromatograph (available from Yokogawa Denki Kabushiki Kaisha, IC 7000). FIG. 7 shows an amount of the released sulphate ion with respect to the repeated times of the SPM cleaning.

It was recognized from FIG. 7 that in case of the raw sheet, the released amount becomes higher than the initial value (no SPM cleaning) and there is a case where the sulphate ion impregnated in the sheet during the SPM cleaning is released into ultra pure water. On the contrary, in case of the smoothed sheet, it was found that every time SPM cleaning was carried out, the released sulphate ion amount scarcely changes from the initial value and there is no impregnation and release of chemicals to and from the sheet.

According to the method of smoothing fluorine-containing resin molded articles of the present invention, smoothing can be conducted so as to give a surface roughness of not more than 500 Å. Particles, metal impurities, organic impurities and the like are difficult to adhere to the surface of the thus obtained smoothed molded articles, and can be removed significantly by washing. Also re-adhesion of them after washing can be prevented. Further gas permeation property, chemical solution permeation property and chemical resistance can be improved.

INDUSTRIAL APPLICABILITY

The fluorine-containing resin molded articles of the present invention have a small surface roughness which has not been obtained hitherto, and are very useful for fields where a smooth plane is required, particularly as materials for equipments and facilities for manufacturing semiconductors and the like. Also particles, metal impurities, organic impurities or the like are difficult to adhere to the surface of the articles, and can be removed significantly by washing. Also re-adhesion of them after washing can be prevented. Further gaspermeation property, chemical solution permeation property and chemical resistance can be improved.

What is claimed is:

1. A method of processing a semiconductor comprising use of a smoothed fluorine-containing resin molded article for preventing contamination of the semiconductor, the smoothed fluorine-containing resin molded article having a surface roughness (Ra) of not more than 500 Å and being resilient in avoiding adhesion of metal impurities thereto, which is obtained by subjecting the fluorine-containing resin molded article to compression molding by simultaneous application of heat and pressure at a molding temperature of 270° to 340° C. and a molding pressure of not less than 10 kg/cm$^2$ for a compression time of not less than 2 minutes.

2. The method of processing a semiconductor according to claim 1, wherein the fluorine-containing resin molded article is made of a melt-processable fluorine-containing resin formed into the fluorine-containing resin molded article by one of injection molding, extrusion molding, blow molding and transfer molding and the fluorine-containing resin molded article contacts the semiconductor during the method of processing a semiconductor.

3. A method of processing a semiconductor in an ultra-clean manufacturing process, which comprises:

conducting the ultra-clean manufacturing process using equipment made from a smoothed fluorine-containing resin molded article for preventing contamination of the semiconductor, the smoothed fluorine-containing resin molded article having a surface roughness (Ra) of not more than 500 Å and being resilient in avoiding adhesion of metal impurities thereto, which is obtained by subjecting the fluorine-containing resin molded article to compression molding by simultaneous application of heat and pressure at a molding temperature of 270° to 340° C. and a molding pressure of not less than 10 kg/cm$^2$ for a compression time of not less than 2 minutes.

4. The method of processing a semiconductor in an ultra-clean manufacturing process method of processing a semiconductor according to claim 3, the fluorine-containing resin molded article is made of a melt-processable fluorine-containing resin formed into the fluorine-containing resin molded article by one of injection molding, extrusion molding, blow molding and transfer molding and the method of processing a semiconductor includes a step of washing a surface of the smoothed fluorine-containing resin molded article for removing impurities therefrom.

* * * * *